(12) United States Patent
Ye et al.

(10) Patent No.: US 7,763,105 B2
(45) Date of Patent: Jul. 27, 2010

(54) ADJUSTABLE AIR FILTER FOR COMPUTER AND ASSEMBLY USING THE SAME

(75) Inventors: Zhen-Xing Ye, Shenzhen (CN); Ke Sun, Shenzhen (CN); Xiao-Zhu Chen, Shenzhen (CN); Ming-Ke Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 296 days.

(21) Appl. No.: 11/963,872

(22) Filed: Dec. 24, 2007

(65) Prior Publication Data

US 2008/0295468 A1 Dec. 4, 2008

(30) Foreign Application Priority Data

May 31, 2007 (CN) .......................... 2007 1 0200728

(51) Int. Cl.
*B01D 46/00* (2006.01)
(52) U.S. Cl. .................. 96/401; 55/385.6; 55/422; 55/480; 55/493; 55/496; 96/420
(58) Field of Classification Search ............... 55/385.6, 55/493, 495, 501, 511, 313, 422, DIG. 31, 55/496, 480; 96/402, 401, 420; 454/184, 454/192
See application file for complete search history.

(56) References Cited

U.S. PATENT DOCUMENTS

| 3,393,498 | A | * | 7/1968 | Schoen ......................... 55/493 |
| 4,312,645 | A | * | 1/1982 | Mavros et al. ................ 96/400 |
| 4,682,993 | A | * | 7/1987 | Todd et al. .................... 55/314 |
| 4,698,078 | A | * | 10/1987 | Mavros ........................ 96/402 |
| 4,963,170 | A | * | 10/1990 | Weber et al. .................. 55/311 |
| 5,935,282 | A | * | 8/1999 | Lin ............................. 55/385.6 |
| 7,364,602 | B2 | * | 4/2008 | Wu et al. ...................... 55/493 |

* cited by examiner

*Primary Examiner*—Duane Smith
*Assistant Examiner*—Minh-Chau T Pham
(74) *Attorney, Agent, or Firm*—Frank R. Niranjan

(57) ABSTRACT

An adjustable air filter for a computer, includes a bracket, a plurality of frames with air filter units set therein rotatably mounted to the bracket, a first transmission bar connected with each of the frames, a second transmission bar rotatably mounted to the bracket and connected with the first transmission bar, and a driver fixed to the bracket with a shaft retractably extending therefrom. The first transmission bar drives the frames to rotate when the first transmission bar is moved. The second transmission bar drives the first transmission bar to move when the second transmission bar is rotated. The shaft of the driver is connected with the second transmission bar. The driver drives the shaft to extend out or draw back according to the temperature in the computer to drive the second transmission bar to rotate.

11 Claims, 4 Drawing Sheets

ADJUSTABLE AIR FILTER FOR COMPUTER AND ASSEMBLY USING THE SAME

BACKGROUND

1. Field of the Invention

The present invention relates to adjustable air filters for computers and assemblies using the same.

2. Description of Related Art

A plurality of holes is usually defined in a bezel of a computer case for dissipating heat. However, dust can go through the holes and accumulate in the case, which may lead to components in the case breaking down. Thus, people need to disassemble the case and clean out the dust. However, it is time-consuming and boring to do the cleaning job What is desired, therefore, is an adjustable air filter for a computer.

SUMMARY

An exemplary adjustable air filter for a computer, includes a bracket, a plurality of frames with air filters set therein rotatably mounted to the bracket, a first transmission bar connected with each of the frames, a second transmission bar rotatably mounted to the bracket and connected with the first transmission bar, and a driver fixed to the bracket with a shaft retractably extending therefrom. The first transmission bar drives the frames to rotate when the first transmission bar is moved. The second transmission bar drives the first transmission bar to move when the second transmission bar is rotated. The shaft of the driver is connected with the second transmission bar. The driver drives the shaft to extend out or draw back, according to the temperature in the computer, to drive the second transmission bar to rotate.

Other advantages and novel features will become more apparent from the following detailed description when taken in conjunction with the accompanying drawings, in which:

DETAILED DESCRIPTION

Figure 1:
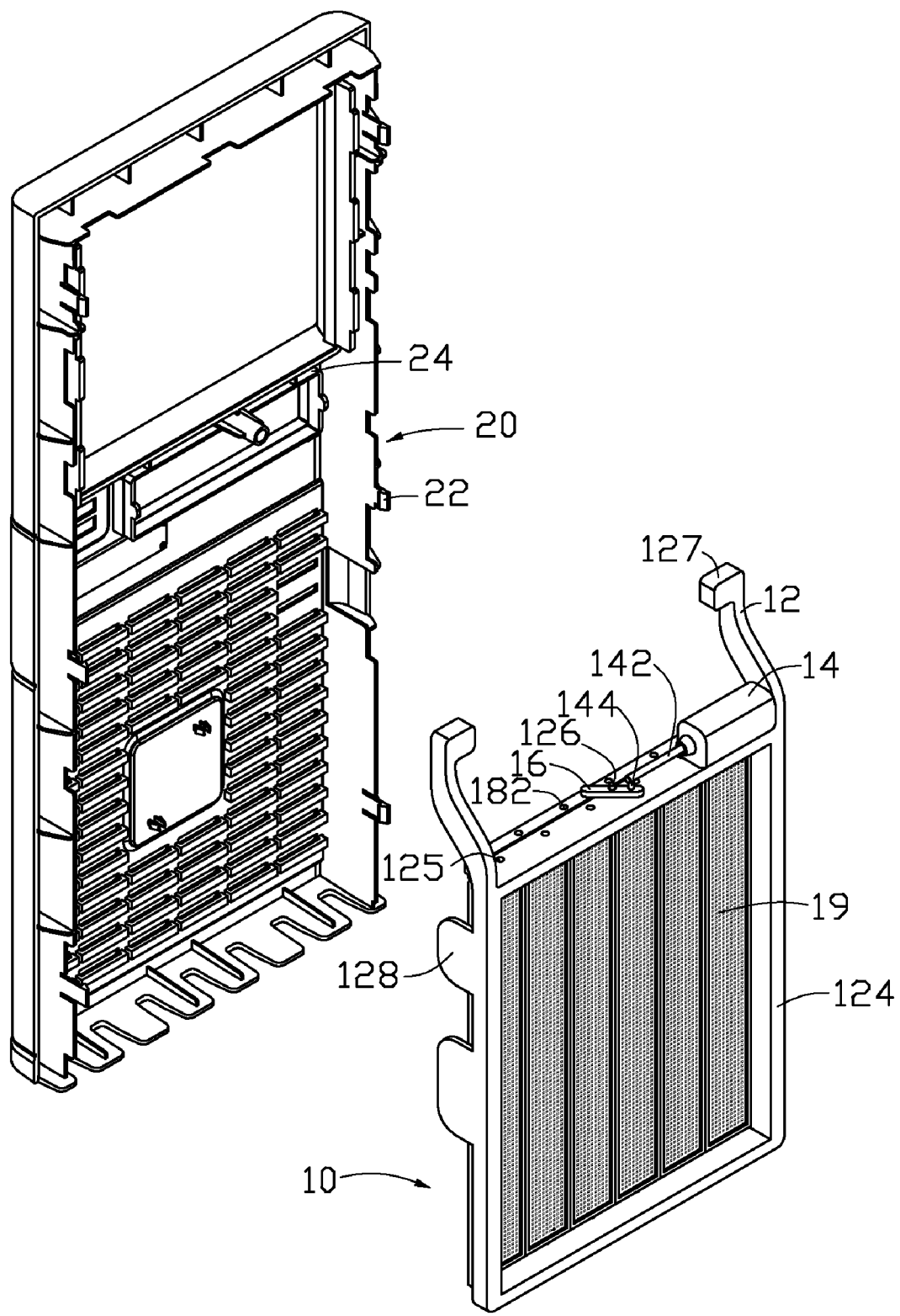
FIG. 1 is an isometric view of an adjustable air filter and a bezel in accordance with an embodiment of the present invention.

Referring to FIG. 1, an adjustable air filter 10 in accordance with an embodiment of the present invention is used to mount to a bezel 20 of a computer case for filtering dust from air entering the computer.

Two pairs of elastic clipping tongues 22 respectively extend from opposite sides of the bezel 20. A pair of coupling grooves 24 is symmetrically defined in an inner wall of the bezel 20.

Figure 2:
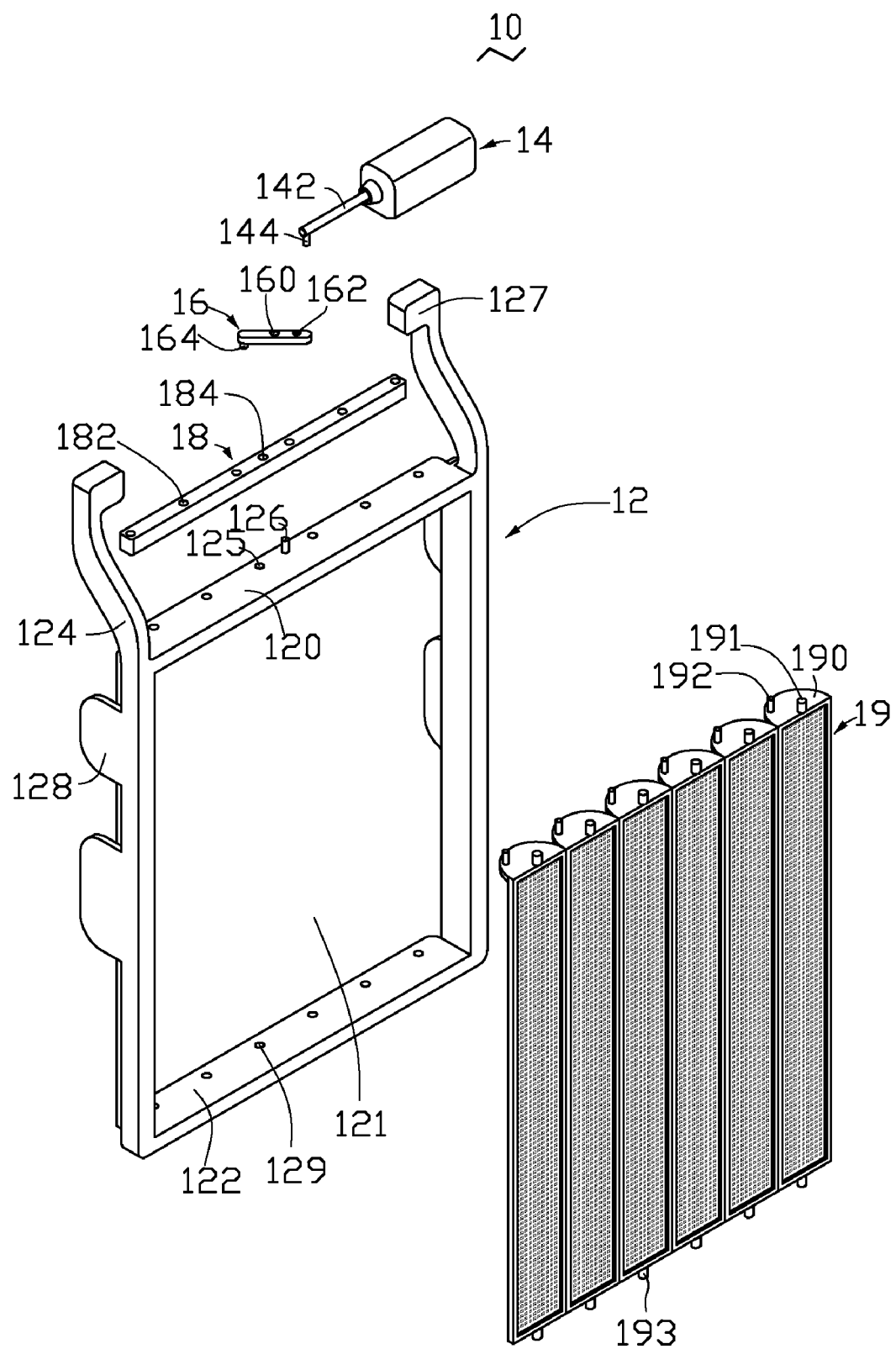
FIG. 2 is an exploded, isometric view of the adjustable air filter in FIG. 1.

Referring also to FIG. 2, the adjustable air filter 10 includes a bracket 12, a driver 14, a first transmission bar 18, a second transmission bar 16, and a plurality of air filter units 19.

The bracket 12 includes a pair of opposite arms 124, an upper beam 120 connected between upper portions of the arms 124, and a lower beam 122 connected between lower ends of the arms 124. An opening 121 is bounded by the pair of arms 124, the upper beam 120, and the lower beam 122.

The upper beam 120 includes a pivot 126 extending from the middle of an upper surface thereof, and a plurality of aligned holes 125 is defined in the beam 120. A plurality of aligned holes 129 is defined in the lower beam 122 corresponding to the holes 125 of the upper beam 120. Each arm 124 includes two blocking pieces 128 extending from a middle portion thereof and a coupling block 127 extending from a top end thereof.

The driver 14 includes an extendable shaft 142 protruding therefrom, a motor (not shown) set therein, and a processor (not shown) set therein. The shaft 142 includes a post 144 extending downward adjacent its free end.

The second transmission bar 16 includes a post 164 extending downward therefrom adjacent an end thereof, a first hole 162 defined adjacent another end thereof, and a second hole 160 define in the middle thereof.

A plurality of aligned first holes 182 is defined in the first transmission bar 18, and a second hole 184 is defined in the middle of the first transmission bar 18.

Each air filter unit 19 includes a rectangular frame, an air filter set in the frame, a semicircular piece 190 perpendicularly extending from an upper side of the frame, a pivot 191 extending perpendicularly from the center of the semicircle of the piece 190, a post 192 extending perpendicularly from an circumference of the piece 190, and a pivot 193 extending from a lower side of the frame aligned with the corresponding pivot 191.

Figure 3:
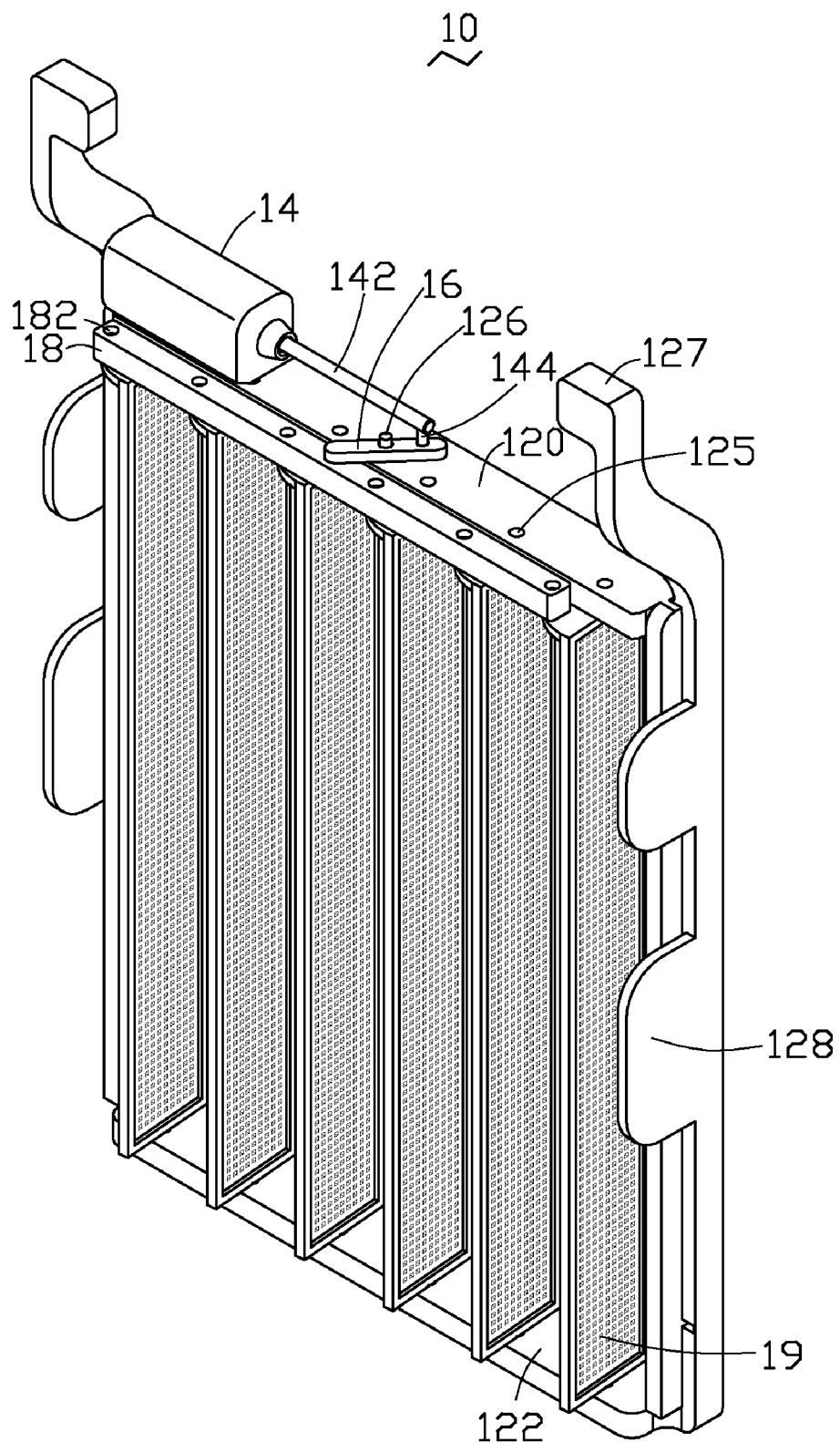
FIG. 3 is an assembled, isometric view of FIG. 2, but viewed from another aspect.

Referring also to FIG. 3, in assembling the adjustable air filter 10, the air filter units 19 are rotatably mounted in the opening 121 of the bracket 12 via the pivots 191 thereof engaging in the holes 125 of the upper beam 120 respectively and the pivots 193 thereof engaging in the corresponding holes 129 of the lower beam 122 respectively. The first transmission bar 18 is mounted to the air filter unit 19 via the post 192 of each air filter unit 19 engaged in a corresponding hole 182 of the first transmission bar 18. The post 164 of the second transmission bar 16 is engaged with the second hole 184 of the first transmission bar 18, and the pivot 126 of the upper beam 120 is engaged with the second hole 160 of the second transmission bar 16. The driver 14 is affixed to the upper beam 120 of the bracket 12, and the post 144 is engaged with the first hole 162 of the second transmission bar 16.

Figure 4:
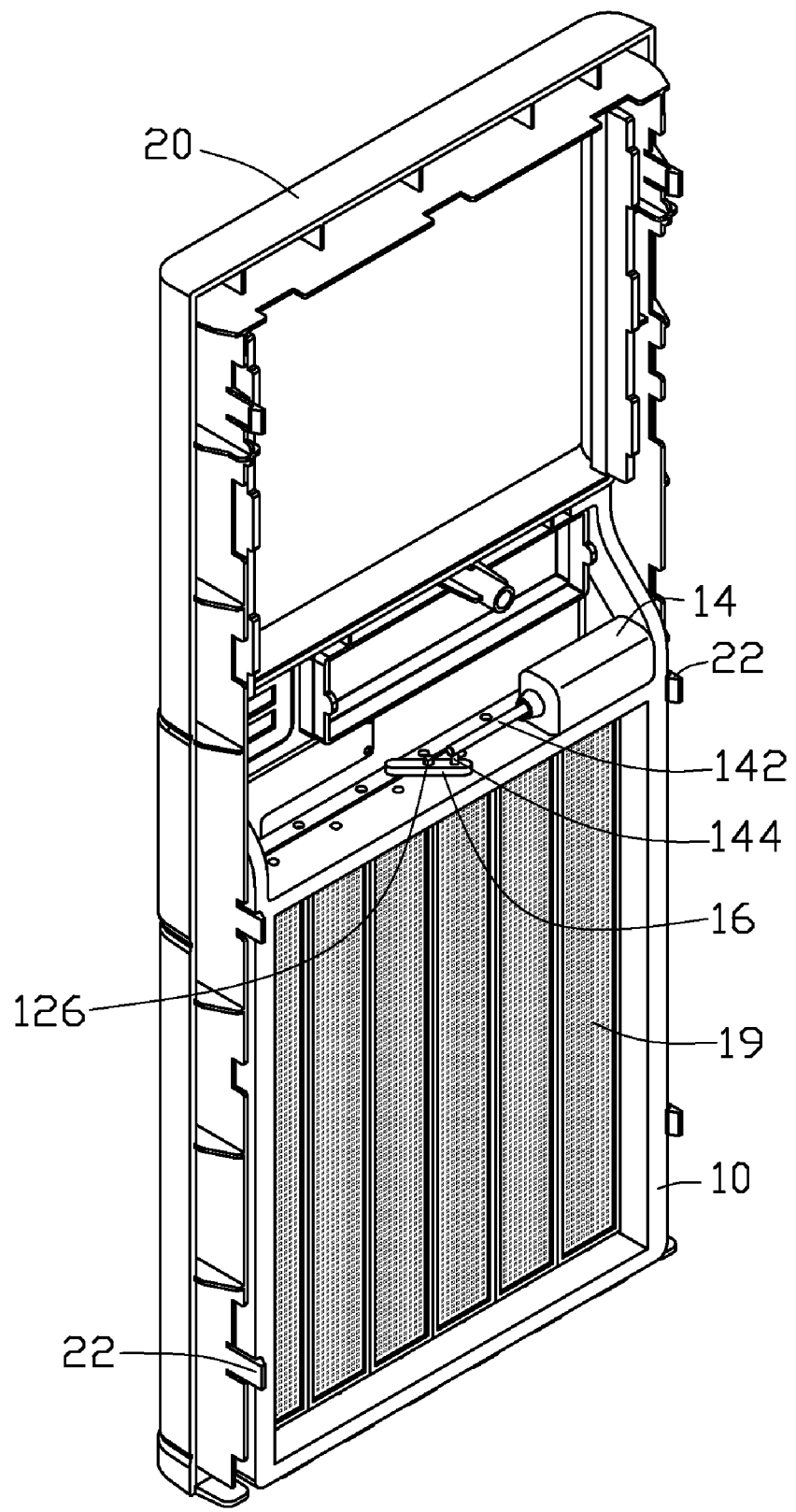
FIG. 4 is an assembled, isometric view of FIG. 1.

Referring to FIGS. 1 and 4, in assembling the adjustable air filter 10 to the bezel 20, the coupling blocks 127 of the adjustable air filter 10 are respectively received in the coupling grooves 24, and the arms 124 of the adjustable air filter 10 are clamped by the two pairs of elastic clipping tongues 22 of the bezel.

In use, the processor of the driver 14 controls the motor to drive the shaft 142 of the driver 14 to extend out or draw back according to the temperature in the computer case. When the shaft 142 of the driver 14 is extended out, the post 144 of the driver 14 drives the second transmission bar 16 to rotate around the post 126 of the adjustable air filter 10, the first transmission bar 18 is driven by the second transmission bar 16 to move towards the driver 14 via the engagement between the post 164 of the second transmission bar 16 and the second hole 184 of the first transmission bar 18, and the first transmission bar 18 drives the air filter units 19 to rotate via the engagement between the posts 192 of the dustproof units 19 and the corresponding first holes 182 of the first transmission bar 18, so that the air filter units 19 of the adjustable air filter 10 are opened. In the same way, when the shaft 142 of the driver 14 is drawn back, the air filter units 19 of the adjustable air filter 10 are closed. Thus, when the temperature in the computer case is low, the air filter units 19 are kept closed to filter dust from air flowing therethrough, and when the temperature is high, the adjustable air filter 10 is opened for helping dissipate heat. It is noted that the blocking pieces 128 of the adjustable air filter 10 is used to engage with a front wall of the bezel 20 to form a space between the front wall of the bezel 20 and the air filter units 19 of the adjustable air filter 10, to allow room for the air filter units 19 to rotate.

It is believed that the present embodiment and its advantages are understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. An adjustable air filter for a computer, comprising:
   a bracket;
   a plurality of frames with air filters set therein rotatably mounted to the bracket;
   a first transmission bar connected with each of the frames, the first transmission bar driving the frames to rotate when the first transmission bar is moved;
   a second transmission bar rotatably mounted to the bracket and connected with the first transmission bar, the second transmission bar driving the first transmission bar to move when the second transmission bar is rotated; and
   a driver fixed to the bracket with a shaft retractably extending therefrom, the shaft being connected with the second transmission bar, the driver driving the shaft to extend out or draw back according to the temperature in the computer to drive the second transmission bar to rotate.

2. The adjustable air filter as claimed in claim 1, wherein the bracket comprises a pair of opposite arms, an upper beam connected between upper portions of the arms, and a lower beam connected between lower ends of the arms, an opening is bounded by the pair of arms, the upper beam, and the lower beam, the frames are set in the opening.

3. The adjustable air filter as claimed in claim 2, wherein a plurality of aligned holes is defined in the upper beam, a plurality of aligned holes is defined in the lower beam corresponding to the holes of the upper beam, a first pivot extends from an upper side of each of the frames, a second pivot extending from a lower side of each of the frames aligned with the corresponding first pivot, the first pivots of the frames rotatably engage in the holes of the upper beam respectively, and the second pivots of the frames rotatably engage in the corresponding holes of the lower beam respectively.

4. The adjustable air filter as claimed in claim 3, wherein a semicircular piece, at a center of which the first pivot is located, perpendicularly extends from an upper side of each of the frames, a post perpendicularly extends from an circumference of the piece of each of the frames, a plurality of first holes is define in the first transmission bar, the posts of the frames rotatably engage in the first holes of the first transmission bar respectively.

5. The adjustable air filter as claimed in claim 4, wherein the upper beam comprises a post extends from a middle portion thereof, a first hole is defined in the second transmission bar, the post of the upper beam rotatably engages with the first hole of the second transmission bar.

6. The adjustable air filter as claimed in claim 5, wherein a post extends from the second transmission bar adjacent an end of the second transmission bar, a second hole is defined in the first transmission bar, the post of the second transmission bar rotatably engages with the second hole of the first transmission bar.

7. The adjustable air filter as claimed in claim 6, wherein a second hole is defined in the second transmission bar adjacent another end of the second transmission bar, a post extends from the shaft of the driver, the post of the shaft of the driver rotatably engages with the second hole of the second transmission bar.

8. An assembly for filtering air, comprising a bezel and an adjustable air filter mounted to the bezel, wherein the adjustable air filter comprises:
   a bracket;
   a plurality of frames with air filters set therein rotatably mounted to the bracket;
   a first transmission bar connected with each of the frames, the first transmission bar driving the frames to rotate when the first transmission bar is moved;
   a second transmission bar rotatably mounted to the bracket and connected with the first transmission bar, the second transmission bar driving the first transmission bar to move when the second transmission bar is rotated; and
   a driver fixed to the bracket with a shaft retractably extending therefrom, the shaft being connected with the second transmission bar, the driver driving the shaft to extend out or draw back according to the temperature in the computer to drive the second transmission bar to rotate.

9. The assembly for filtering air as claimed in claim 8, wherein the bracket of the adjustable air filter comprises a pair of opposite arms, the bezel comprises at least a pair of elastic clipping tongues respectively extending from opposite sides thereof configured to respectively clamp the arms of the bracket.

10. The assembly for filtering air as claimed in claim 9, wherein a coupling block extends from each of the arms of the bracket of the adjustable air filter, a pair of coupling grooves is defined in an inner wall of the bezel configured for respectively receiving the coupling blocks of the arms.

11. The assembly for filtering air as claimed in claim 9, wherein each of the arms of the bracket of the adjustable air filter includes at least one blocking pieces extending therefrom, configure to engage with a front wall of the bezel to form a space between the front wall of the bezel and the frames of the adjustable air filter.

* * * * *